UNITED STATES PATENT OFFICE.

AUGUST STOCK, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VIOLET TETRACHLORINDIGO AND PROCESS OF MAKING SAME.

1,050,179.     Specification of Letters Patent.     Patented Jan. 14, 1913.

No Drawing.     Application filed March 7, 1912. Serial No. 682,278.

*To all whom it may concern:*

Be it known that I, AUGUST STOCK, Ph. D., chemist, a citizen of the Empire of Germany, residing at Höchst-on-the-Main, Germany, have invented certain new and useful Improvements in Violet Tetrachlorindigo and Processes of Making Same, of which the following is a specification.

I have found that a tetrachlorindigo of great value is obtained by transforming the 4.5-dichlor-2-nitrobenzaldehyde into indigo by condensation with bodies of the formula: $CH_3-CO-R$, wherein "R" stands for hydrogen or an organic radical, and by then treating the condensation product with alkali. The tetrachlorindigo thus obtained dyes beautiful violet tints with a red hue.

The 4.5-dichlor-2-nitrobenzaldehyde is produced by nitrating the 4.5-dichlorbenzaldehyde; when crystallized in benzene it forms yellow prisms melting at 73° C. By condensing it with acetone by means of an alkali, the dichlorphenyllactomethylketone, melting at 116° C., is obtained, which is converted into tetrachlorindigo by the further action of the alkali.

*Example:* Ten parts by weight of 4.5-dichlor-2-nitrobenzaldehyde are dissolved in 180 parts of acetone, there is then added a solution of 3 parts of crystallized sodium sulfite in 120 parts of water, and the mixture is stirred for one hour at 5° C. To the dichlorphenyllactomethylketone thus formed is added a solution of 5 gr. of calcined sodium carbonate in 50 parts of water, and the whole is heated for some hours to 30–40° C. The tetrachlor-indigo thus separated is filtered, washed with acetone and subsequently with water, and dried.

The 5, 6, $5^1$, $6^1$ tetrachlorindigo is a violet powder, insoluble in water, very slightly soluble in acetone and chloroform with a violet color, in glacial acetic acid with a blue color, in cold concentrated sulfuric acid with a dull yellowish-gray color which turns green when heated on the water-bath, dissolving in an alkaline-hydrosulfite solution to a yellow vat which dyes cotton and wool beautiful reddish-violet tints.

Having now described my invention, what I claim, is:

1. The process of manufacturing a violet tetrachlorindigo, which consists in condensing 4.5-dichlor-2-nitrobenzaldehyde with a body containing the group $CH_3-CO-R$, and treating the condensation product with an alkali.

2. As a new product, the 5, 6, $5^1$, $6^1$ tetrachlorindigo, which body forms a violet powder, insoluble in water, very slightly soluble in acetone and chloroform with a violet color, in glacial acetic acid with a blue color, in cold concentrated sulfuric acid with a dull yellowish-gray color which turns green when heated on the water-bath, dissolving in an alkaline-hydrosulfite solution to a yellow vat which dyes cotton and wool beautiful reddish-violet tints.

In testimony whereof, I affix my signature in presence of two witnesses.

AUGUST STOCK.

Witnesses:
    JEAN GRUND,
    CARL GRUND.